(12) United States Patent
Sarin

(10) Patent No.: US 11,799,638 B2
(45) Date of Patent: Oct. 24, 2023

(54) SHARED CRYPTOGRAM GENERATION DURING MULTI-PARTY DIGITAL TOKEN PROCESSING

(71) Applicant: PAYPAL, INC., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 323 days.

(21) Appl. No.: 17/142,861

(22) Filed: Jan. 6, 2021

(65) Prior Publication Data

US 2022/0216989 A1    Jul. 7, 2022

(51) Int. Cl.
 *H04L 9/08*    (2006.01)
(52) U.S. Cl.
 CPC ............ *H04L 9/0861* (2013.01); *H04L 9/085* (2013.01)
(58) Field of Classification Search
 CPC ... H04L 9/0861; H04L 9/088; H04L 2209/46; H04L 2209/56; G06Q 20/00
 See application file for complete search history.

(56) References Cited

U.S. PATENT DOCUMENTS

| | | | | |
|---|---|---|---|---|
| 9,722,996 | B1 * | 8/2017 | Kolman | ................ H04L 63/083 |
| 2009/0006262 | A1 * | 1/2009 | Brown | ...................... H04L 9/32 |
| | | | | 705/64 |
| 2016/0239836 | A1 * | 8/2016 | von Mueller | ....... H04L 63/0428 |
| 2017/0255937 | A1 * | 9/2017 | Maddukuri | ........ G06Q 20/3674 |
| 2020/0104833 | A1 * | 4/2020 | Rule | ..................... G06F 21/602 |
| 2020/0412528 | A1 * | 12/2020 | Saint | ..................... H04L 9/3234 |
| 2021/0176060 | A1 * | 6/2021 | Kallugudde | ......... H04L 9/3213 |

* cited by examiner

*Primary Examiner* — Alexander Lagor
*Assistant Examiner* — Lydia L Noel
(74) *Attorney, Agent, or Firm* — Haynes and Boone, LLP

(57) ABSTRACT

There are provided systems and methods for shared cryptogram generation during multi-party digital token processing. A service provider, such as an electronic transaction processor for digital transactions, may require tokenized data in order to protect sensitive or secure data, such as payment card data during electronic transaction processing. In this regard, the service provider may tokenize the data, which may require a cryptogram for validation of a corresponding digital token. The cryptogram may be generated based on input from multiple participants to the transaction, where a length of the cryptogram may be determined based on a risk score for the transaction. Each transaction participant may be assigned one or more slots or values in the cryptogram to provide based on the risk score and other rules for cryptogram generation. Each participant may provide corresponding portions, where the service provider may generate and backwards update the participants of the cryptogram.

20 Claims, 6 Drawing Sheets

US 11,799,638 B2

SHARED CRYPTOGRAM GENERATION DURING MULTI-PARTY DIGITAL TOKEN PROCESSING

TECHNICAL FIELD

The present application generally relates to tokenization processes and cryptogram schemes for token security and more particularly to cryptogram generation between multi-parties to provide more robust cryptogram security.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. During use of these computing services, processing platforms, and services, the service provider may provide tokenization processes to secure data when transmitted between parties, where the tokenization process substitutes some secure data for a randomized or meaningless data string. Digital tokens in certain tokenization processes may be coupled to cryptograms, which may correspond to a limited use key that acts as a validating factor for the digital token. When the party issuing the digital token generates the cryptogram, the cryptogram follows the digital token to other participants that utilize the digital token. This single creation and transmission opens the cryptogram to computing attacks and other malicious actions that may compromise the cryptogram. Thus, a single tokenization participant that creates the cryptogram may cause sensitive data to be exposed.

Figure 1:
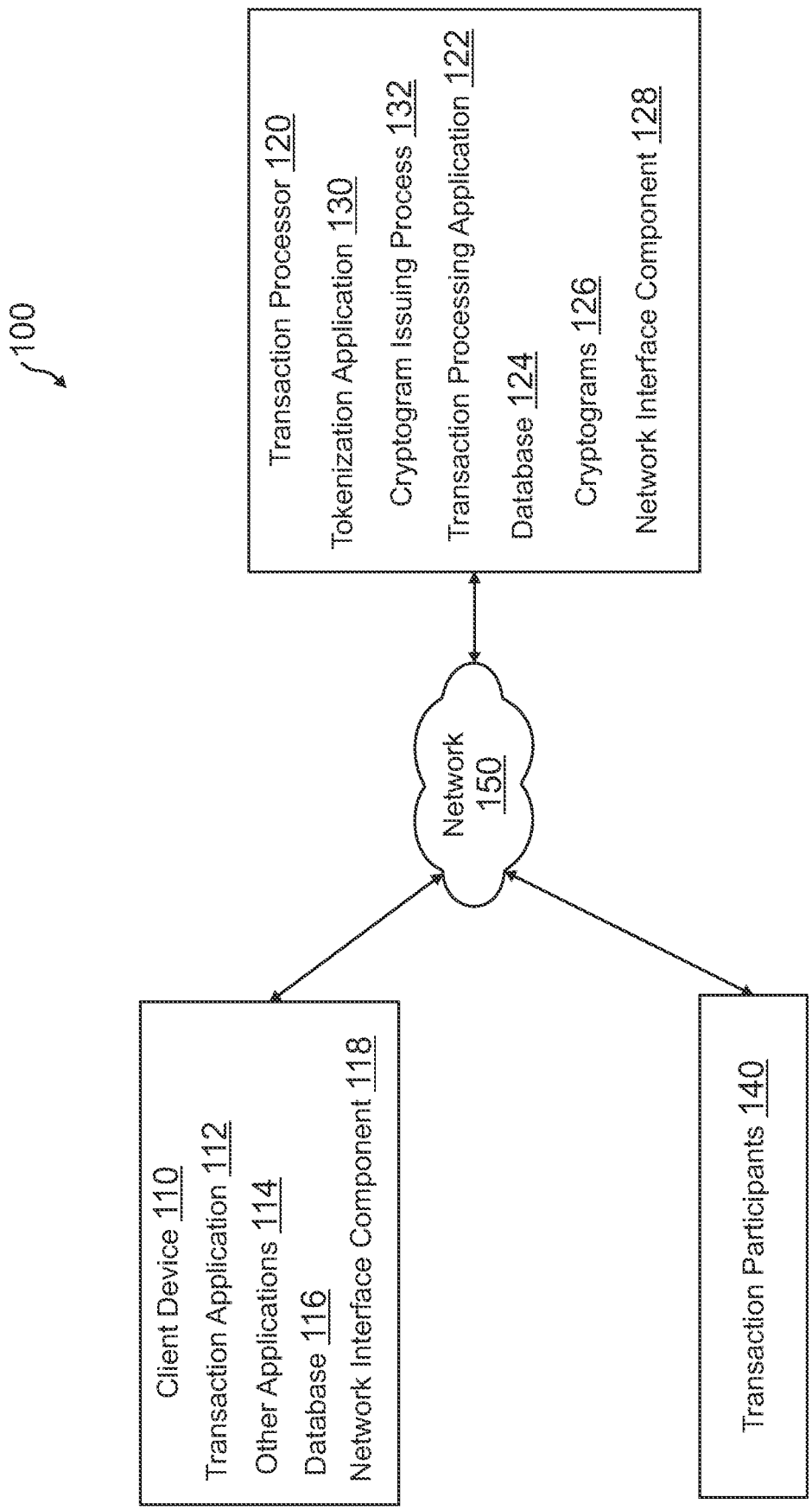
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for shared cryptogram generation during multi-party digital token processing. Systems suitable for practicing methods of the present disclosure are also provided.

A service provider may provide different computing resources and services to users through different websites, resident applications (e.g., which may reside locally on a computing device), and/or other online platforms.

When utilising the services of a particular service provider, the service provider may provide tokenization processes through digital tokens in order to reduce risk, fraud, and other misappropriation of data. For example, an online transaction processor may provide electronic transaction processing services, including account services, user authentication and verification, digital payments, risk analysis and compliance, and the like. Data transmitted between different participants to an electronic transaction or other online interaction, such as sensitive account and/or authentication data, personally identifiable data (PII), financial or other payment data, and the like, may require tokenization in order to provide security measures and data protection to the service provider and users of the service provider (e.g., customers, merchants, and other entities). In order to provide more secure tokenization processes, a transaction processor may provide multi-party cryptogram generation through a key generation scheme for a cryptogram associated with a token. Each participant in the transaction or other interaction may be assigned one or more alphanumeric characters to determine, randomize, and/or provide the alphanumeric characters to particular places or slots within the cryptogram. This may be done based on a risk assessment or score of the underlying transaction or other interaction based on an intelligent risk analysis system. Thereafter, as each participant provides the required cryptogram characters, the transaction processor may backwards update the other transaction participants through a data table that logs the cryptogram creation of the changes to the cryptogram characters. Once the cryptogram is completed, the transaction processor may utilize the cryptogram with the associated digital token representing the secure data.

For example, a service provider, such as an online transaction processor (e.g., PayPal®), may provide services to users, including electronic transaction processing that allows merchants, users, and other entities to process transactions, provide payments, and/or transfer funds between these users. When interacting with the service provider, the user may process a particular transaction to provide a payment to another user or a third-party for items or services using exchanged digital tokens. Moreover, the user may view one or more digital accounts and/or digital wallets, including a transaction history and other payment information associated with the user's payment instruments and/or digital wallet that stores and/or generates digital tokens. The user may also interact with the service provider to establish an account and other information for the user. In further embodiments, other service providers may also provide computing services, including social networking, microblogging, media sharing, messaging, business and consumer platforms, etc. These computing services may each require the tokenization processes for token generation and/or exchange, which utilize the multi-party cryptogram generation scheme discussed herein.

In order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of aforementioned data and/or digital wallet data for transaction processing. Thus, a transaction processor, such as PayPal® or other online payment providers, may serve as a token service provider for token generation and/or exchange.

A user or other entity may initiate electronic transaction processing for a transaction (or perform another secure interaction, such as account or user verification, authentication, and the like) that requires data to be tokenized through a resident computing application or website of a transaction processor. The transaction processor may include operations for cryptogram or other token key scheme determination, cryptogram sync between participants to the transaction, and cryptogram and risk rules and score determination. The transaction processor may act as a token service provider or interact with token service provider networks (e.g., an issuer, acquirer, and/or payments processor) used for tokenization processes. In order to dynamically determine a multi-party cryptogram generation scheme, the transaction processor may perform a risk analysis on the transaction to determine a risk score of the transaction. This risk score may correspond to a security level or assessment of the overall security of the transaction, participants, and/or data communications between the participants during the token exchange, processing, and other operations performed to process the transaction. This risk score may further be passed with the transaction data and/or digital token/cryptogram later, for example, to monitor activity during cryptogram generation and/or token exchange and view attacks on the system or participants in order to update the risk score and cryptogram generation scheme.

Using the risk score, the transaction processor may then determine a key length of the cryptogram, which may correspond to a number of alphanumeric characters, symbols, or individual spots or places for assignment of some data to the cryptogram. For example, a cryptogram may have a key length of 18 key spots, characters, or portions, where each spot is assigned an alphanumeric character, symbol, or the like. However, other data may be used, such as randomized byte chunks, tuples, graphics or images, or the like that may be used for cryptogram generation by certain tokenization schemes. Using the cryptogram key length, a cryptogram or "key" determination scheme may be determined for the participants to the transaction, which may be referred to herein as "key" participants that interact in the generation of the cryptogram with the transaction processor. The key determination scheme may correspond to a number and/or placement of the spots for the cryptogram to each of the key participants. For example, a first key participant may be assigned four spots to generate and provide to the transaction processor for the cryptogram, as well as a specific placement of those spots, in some embodiments (e.g., places corresponding to 2, 4, 6, and 8, from left to right or otherwise, in the 16-digit cryptogram). This may be performed for each key participant, and risk rules may be used to force or assign more or less digits to certain key participants, such as based on rules governing certain transaction participants. Further, in some embodiments, the key generation scheme may include an order that each key participant is required to add their corresponding data for the cryptogram, such as by receiving the cryptogram characters for an acquirer financial entity prior to an issuer financial entity.

The transaction processor may then request the characters for the portions of the cryptogram from each of the assigned key participants via one or more secure channels or agreed upon communication systems. The transaction processor may also be assigned a portion of the cryptogram and may randomly generate and/or insert characters to the portion assigned to the transaction processor (e.g., the one or more spots of the cryptogram responsible to the transaction processor). The transaction processor may further generate a data table used to record changes to the cryptogram and the cryptogram generation. For example, in an initial table row, the key participant (e.g., the transaction processor) that first adds characters to their corresponding portion of the cryptogram may be recorded with a corresponding timestamp. Further columns may include cryptogram completion (e.g., percentage, number of missed/entered spots, etc.), cryptogram characters, added characters, and the like. As the transaction processor updates the cryptogram and the data table from portions of the cryptogram received from the key participants and/or added by the transaction processor, the transaction processor may backwards update the other key participants with the cryptogram characters and/or data table. This allows the key participants to view cryptogram construction, generation, and any risk information. In order to secure communications for cryptogram characters, the transaction processor may use an encryption scheme, handshake, or other secure channel. Further, smart contracts may be used to decentralize cryptogram generation between the parties.

Thereafter, when the cryptogram is complete, the transaction processor may finalize the cryptogram. The cryptogram may then be issued with the digital token for data processing, such as with the token service provider and other participants to the transaction. The transaction processor may further backwards update the key participants, as well as other participants (e.g., user and merchant) when necessary, of the completed cryptogram and/or data table for the completed cryptogram. However, in other embodiments, one or more key participants may be unavailable or otherwise compromised, and a time frame or threshold cryptogram creation time period may expire. In such embodiments, the transaction processor may complete the missing portions of the cryptogram or may assign a null value. The transaction processor may run risk scores and/or rules to determine if the cryptogram should be completed in such a manner, as well as to override or change portions and/or characters provided by the key participants.

In some embodiments, the key participants may also run risk assessments and/or determine risk rules, which may be used to request a change to the number and/or placement of the characters assigned to the key participant for their corresponding portion. In such embodiments, the transaction processor may determine whether a security threat is detected and/or whether to change the key determination scheme as detected, such as based on risk rules or scores.

Further, if a security threat is detected, the transaction processor or another key participant may change the cryptogram key length and/or request a step-up authentication from the user, merchant, or other participant to the transaction. In this manner, a cryptogram used in digital token security may be more secure when used for tokenization schemes for data security during electronic data communications.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a transaction processor 120, and transaction participant devices or transaction participants 140 in communication over a network 150. Client device 110 may be utilized by a user to access a computing service or resource provided by transaction processor 120, where transaction processor 120 may provide various data, operations, and other functions to client device 110 via network 150. This may include electronic transaction processing services or other services that require tokenized data. In this regard, client device 110 may be used to request data tokenization, for example, through a token service provider, in order to process a transaction or other interaction having tokenized data with transaction participants 140. Transaction processor 120 may request multiparty cryptogram generation with transaction participant in order to generate a cryptogram for use with a digital token.

Client device 110, transaction processor 120, and transaction participants 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with transaction processor 120 and/or transaction participants 140. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains a transaction application 112, other application 114, a database 116, and a network interface component 118. Transaction application 112 may correspond to executable processes, procedures, and/or applications with associated hardware. In other embodiments, client device 110 may include additional or different modules having specialized hardware and/or software as required.

Transaction application 112 may correspond to one or more processes to execute modules and associated components of client device 110 to interact with a service provider or other online entity that may provide account services, resources, and services that may include use of tokenized data, such as for electronic transaction processing using transaction processor 120. In this regard, transaction application 112 may correspond to specialized hardware and/or software utilized by client device 110 to establish an account and utilize the account, which may include generating account, user, device, transaction, and financial data associated with the account. Transaction application 112 may be used to register and access an account, such as by providing user personal and/or financial information, setting authentication information, queries, and challenges, and maintaining the account by providing other necessary information for account usage and/or verification. In this regard, with a transaction processor system, transaction application 112 may be used, during electronic transaction processing, to utilize user financial information, such as credit card data, bank account data, or other funding source data, as a payment instrument associated with the account for electronic transaction processing of a transaction. For example, transaction application 112 may utilize a digital wallet associated with the account as the payment instrument, for example, through accessing a digital wallet or account of a user through entry of authentication credentials and/or by providing a data token that allows for processing using the account. Transaction application 112 may also be used to perform electronic transaction processing through tokenized data. This may include requesting tokenization of digital wallet and/or financial data (e.g., a payment/credit/debit card number). However, in other embodiments, transaction application 112 and the account may be used for other types of services that use tokenized data in one or more processes, such as messaging, email, social networking or media, media sharing, microblogging, and/or other online activities.

Transaction application 112 may correspond to a general browser application configured to retrieve, present, and communicate information over the Internet (e.g., utilize resources on the World Wide Web) or a private network. For example, transaction application 112 may provide a web browser, which may send and receive information over network 150, including retrieving website information, presenting the website information to the user, and/or communicating information to the website. However, in other embodiments, transaction application 112 may include a dedicated application of transaction processor 120 or other entity (e.g., payment provider, merchant, etc.), which may be configured to provide services through the application. Transaction application 112 may therefore be used to utilize account and service provider services provided by transaction processor 120, including those associated with electronic transaction processing through tokenized data. In this regard, while utilising the services and data processing features of transaction processor 120, a digital token may be generated that requires a cryptogram generated in the multi-party process described herein. Transaction processor 120 may generate a risk score for the electronic transaction processing using intelligent decision-making by the artificial intelligence (AI) models and systems, such as machine learning (ML) and neural network (NN) models and systems. These may include risk analysis and/or fraud detection systems, such as electronic transaction processing systems. Thereafter, a cryptogram key length may be determined using the risk score, and the transaction may be processed using the token and cryptogram.

In various embodiments, computing device 110 also includes other applications 114 as may be desired in particular embodiments to provide features to computing device 110. For example, other applications 114 may include security applications for implementing client-side security features, programmatic client applications for interfacing with appropriate application programming interfaces (APIs) over network 150, or other types of applications. Other applications 114 may also include additional communication applications, such as email, texting, voice, social networking, and IM applications that allow a user to send and receive emails, calls, texts, and other notifications through network 150, which may include use of digital tokens and cryptograms generated as discussed herein. Other applications 114 may include device interfaces and other display modules that may receive input and/or output information. For example, other applications 114 may contain software programs, executable by a processor, including a graphical user interface (GUI) configured to provide an interface to the user.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with transaction application 112 and/or other applications 114, identifiers associated with hardware of client device 110, or other appropriate identifiers, such as identifiers used for payment/user/device authentication or identification, which may be communicated as identifying the user/client device 110 to transaction processor 120. Moreover, database 116 may include data used to determine a risk score and/or generate a digital token associated with a cryptogram, such as during electronic transaction processing.

Client device 110 includes at least one network interface component 118 adapted to communicate with transaction processor 120 and/or transaction participants 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 120 may be maintained, for example, by an online service provider, which may provide services that use tokenized data during one or more processing interactions. In this regard, transaction processor 120 includes one or more processing applications which may be configured to interact with client device 110 to provide computing services including electronic transaction processing to users. In one example, transaction processor 120 may be provided by PAYPAL®, Inc. of San Jose, Calif., USA. However, in other embodiments, transaction processor 120 may be maintained by or include another type of service provider including token service providers and the like.

Transaction processor 120 of FIG. 1 includes a tokenization application 130, a transaction processing application 122, a database 124, and a network interface component 128. Tokenization application 130 and transaction processing application 122 may correspond to executable processes, procedures, and/or applications with associated hardware. In other embodiments, transaction processor 120 may include additional or different modules having specialized hardware and/or software as required.

Tokenization application 130 may correspond to one or more processes to execute modules and associated specialized hardware of transaction processor 120 to generate a cryptogram with multiple parties contributing to the cryptogram, such as transaction participants 140. In this regard, tokenization application 130 may correspond to specialized hardware and/or software used by transaction processor 120 to first receive and/or access data for tokenization corresponding to account, user, device, transaction, and/or financial data. In this regard, tokenization application 130 may first receive a transaction or other interaction for processing that requires tokenized data, such as digital token representing sensitive or secure data associated with a digital wallet, financial data (e.g., payment card or bank information), account data, or the like. For example, the data represented by the digital token may be associated with one or more accounts provided by transaction processor 120. The data may also be used for real-time anomaly detection (e.g., risk analysis and/or fraud detection) during real-time decision-making and data processing for the electronic transaction processing.

Thereafter, transaction processor 120 may utilize a token service provider, such as one provided internally by transaction processor 120 and/or externally by one of transaction participants 140, to generate a digital token representing the secure or sensitive data. Further, when utilizing the digital token, a cryptogram may be used as a limited use or one-time use password that is used to verify the digital token and underlying secure or sensitive data when processing the digital token by transaction processor 120 and/or transaction participants 140. In this regard, tokenization application 130 may invoke and execute a cryptogram issuing process 132 that may be used in order to generate a cryptogram through multi-party contribution to the cryptogram. A risk score may be determined for the transaction and/or transaction participants 140, such as based on the transaction data, communication channels, secure communication processes, devices/servers, and other data associated with processing the transaction. The risk score may be used by cryptogram issuing process 132 in order to determine a cryptogram key length having a number of spots or places for alphanumeric characters and the like, such as a 16-key length. Each of transaction processor 120 and transaction participants 140 may be assigned one or more portions of the cryptogram's key length and corresponding spots to provide data, such as one or more randomized or determined alphanumeric characters, in a key determination scheme. The key determination scheme may further include a placement of the portions in the cryptogram, as well as an order for transaction processor 120 and/or transaction participants 140 to add characters to the cryptogram.

Thereafter, transaction processor 120 may utilize cryptogram issuing process 132 of tokenization application 130 to request the portions of the cryptogram and/or provide/insert characters to the cryptogram. For example, cryptogram issuing process 132 may generate a data table that includes each of transaction participants 140, the assigned portions of the cryptogram, and a timestamp of receipt of the assigned portions from transaction participants 140. Cryptogram issuing process 132 may record the additions to the cryptogram by tokenization application 130 and transaction participants 140 in the data table, and may proceed to complete the cryptogram. When requesting the portions from transaction participants 140, cryptogram issuing process 132 may provide the risk score with the cryptogram, as well as recalculate the risk score as needed, which may include changing the assigned portions and/or key length of the cryptogram. Further, as portions are received, cryptogram issuing process 132 may backwards update transaction participants with the cryptogram and the current portions of the cryptogram, as well as the data table. Once completed, tokenization application 130 may then issue and use the cryptogram with the corresponding digital token for electronic transaction processing using transaction processing application 122 and transaction participants 140.

Transaction processing application 122 may correspond to one or more processes to execute modules and associated specialized hardware of transaction processor 120 to process a transaction, which may be assisted by tokenization application 130 for generating digital tokens and multi-party cryptograms. In this regard, transaction processing application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through tokenization application 130. In some embodiments, the financial information may also be used to establish a payment account. Further, after establishment of the account, the account may be used with the various services provided by transaction processor 120. These actions and operations may be used to generate digital tokens and corresponding cryptograms using tokenization application 130.

The payment account may be accessed and/or used through a browser application and/or dedicated payment application executed by client device 110 and engage in transaction processing through transaction processing application 122. Transaction processing application 122 may process the payment and may provide a transaction history to client device 110 for transaction authorization, approval, or denial. Such services, account setup, authentication, electronic transaction processing, and other services of transaction processing application 122 may utilize tokenization application 130 for generating, issuing, and processing digital tokens and corresponding cryptograms. Tokenization application 130 may implement security features through tokenization processing using cryptogram issuing process 132. This allows for performing electronic transaction processing through tokenized data.

Additionally, transaction processor 120 includes database 124. Database 124 may store various identifiers associated with client device 110. Database 124 may also store account data, including payment instruments and authentication credentials, as well as transaction processing histories and data for processed transactions. Database 124 may store financial information and tokenization data including cryptograms 126 generated by tokenization application 130 through multi-party contribution to the cryptograms 126. Such data may be stores as limited use or one-time use passwords for use with verifying the digital tokens. Database 124 may further store data necessary for tokenization application 130, including data used to risk analysis and risk score determination for key lengths of cryptograms 126.

In various embodiments, transaction processor 120 includes at least one network interface component 128 adapted to communicate client device 110 and/or transaction participants 140 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction participants 140 may be maintained, for example, by participants to a transaction or other interaction, which may process digital tokens and cryptograms during electronic transaction processing or other operations. In this regard, transaction participants 140 includes one or more processing applications and database resources which may be configured to interact with client device 110 and transaction processor 120 to process data during services and data processing features provided by transaction processor 120. This may include tokenized data corresponding to one or more features associated with account, user, device, transaction, and/or financial data. In certain embodiments, transaction participants 140 may correspond to additional participants other than transaction processor 120 in electronic transaction processing, such as a token service provider, an acquirer bank or financial institution having electronic transaction processing features over network 150, an issuer bank or financial institution having electronic transaction processing features over network 150, and/or a payee device or server (e.g., a merchant or other entity receiving a payment from client device 110).

In this regard, transaction participants 140 may provide data for risk score determination by an intelligent risk system of transaction processor 120, and may further include risk assessment systems to determine a risk score. Thus, transaction participants 140 may also store account data, including payment instruments and authentication credentials, as well as transaction processing histories and data for processed transactions. Transaction participants 140 may process tokenized data for financial information and tokenization data. Transaction participants may further store data necessary for intelligent decision-making through one or more AI models and systems, such as risk analysis systems, fraud detection systems, and the like. Transaction participants 140 may receive a key determination or generation scheme from transaction processor 120 and/or a request to provide portions of a multi-party cryptogram from transaction processor 120. Transaction participants 140 may provide the corresponding portions as requested, and may receive backward updates with the cryptogram as it is generated based on the provided portions, where the backwards updating may include the partially or completed finished cryptogram and/or a data table associated with the completion of the cryptogram. Once completed, transaction participants 140 may receive a digital token representing secure or sensitive data, such as financial data, as well as the corresponding cryptogram.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
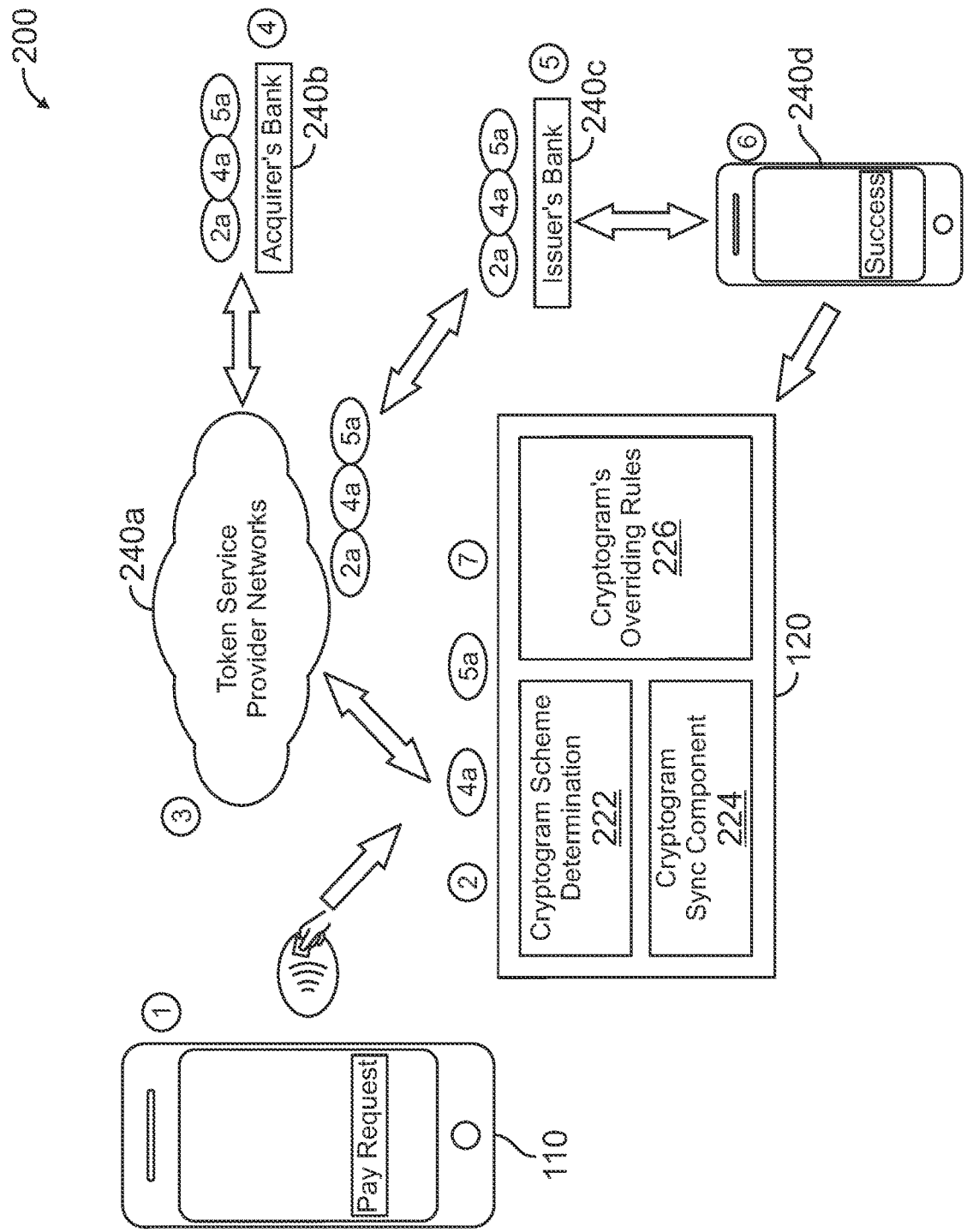
FIG. 2 is an exemplary system architecture for multi-party cryptogram generation, according to an embodiment.

FIG. 2 is an exemplary system environment 200 for multi-party cryptogram generation, according to an embodiment. System environment 200 of FIG. 2 includes an architecture of different components, databases, applications, and the like used by tokenization application 130 discussed in reference to system 100 of FIG. 1. In this regard, client device 110 may request electronic transaction processing or otherwise interact with transaction processor 120 that utilizes tokenized data and cryptograms, where client device 110 and transaction processor 120 are discussed with respect to system 100.

System environment 200 begins where client device 110 requests electronic transaction processing at interaction 1, such as through a payment card or digital wallet. For example, a magnetic stripe, RFID chip, NFC chip, Bluetooth connection, short range wireless communication, or other readable data is provided at a point-of-sale (POS) terminal or the like. This may be done at a physical merchant location having a POS device; however, in other embodiments, electronic transaction processing may be performed online or through another communication process. In this regard, the data for the financial instrument (e.g., payment card or digital wallet) provided at interaction 1 may require tokenization in order to secure the data, which may include use of a cryptogram for validation of a corresponding digital token during processing of the digital token. Thus, at an interaction 2, transaction processor 120 may receive the data for tokenization, and may utilize tokenization application 120 to request generation of a digital token and cryptogram. At further interaction 2a, token service provider networks 240a, an acquirer's bank 240b, an issuer's bank 240c, and a payee device 240d are further in communication with transaction processor 120, such as through a secure communication channel, encrypted communications, or the like, in order to perform electronic transaction processing.

At interaction 3, transaction processor 120 utilizes token service provider networks 240a in order to generate a digital token representing the data associated with the financial instrument from client device 110 or another financial source (e.g., a payment card) provided at interaction 1. Transaction processor 120 uses token service provider networks 240a to tokenize the sensitive financial data, where a cryptogram is then required for validation of the digital token representing the sensitive financial data. Thus, at interaction 3, transaction processor 120 performs a cryptogram scheme determination 222 using cryptogram issuing process 132 of tokenization application 130. Cryptogram scheme determination 222 may first utilize a risk score for the corresponding transaction and/or transaction participants (e.g., one or more of token service provider networks 240a, acquirer's bank 240b, issuer's bank 240c, and/or payee device 240d, as well as client device 110 and/or the financial data being tokenized). The risk score may be used to determine a cryptogram key length, which may determine a number of characters or other spots within the cryptogram.

Further, cryptogram scheme determination 222 may determine corresponding portions of the cryptogram key length to assigned to the transaction participants and/or transaction processor 120. For example, one or more of transaction processor 120, token service provider networks 240a, acquirer's bank 240b, and/or issuer's bank 240c may be assigned one or more alphanumeric characters, symbols, or the like to add to the cryptogram, as well as the positions or placements of those characters. In some embodiments, transaction processor 120 may insert or provide characters to the cryptogram as required by cryptogram scheme determination 222. Further, token service provider networks 240a may also provide characters to the cryptogram as required by cryptogram scheme determination 222.

In various embodiments, cryptogram scheme determination 222 may further include a strategy and/or operations to provide a default alphanumeric character and/or set of alphanumeric characters that can be added to the sequence of the cryptogram by transaction processor 120 if one or more of token service provider networks 240a, acquirer's bank 240b, and/or issuer's bank 240c cannot be reached or fail to provide a response within a specific timeframe or time period. This time period may correspond to a designated time to live (TTL) or the like that designates when a participant may be considered to have timed out or failed to provide a response. For example, transaction processor 120 may require or designate that one of token service provider networks 240a, acquirer's bank 240b, or issuer's bank 240c provides characters at a 6th and 7th position of an 18-character cryptogram within 50 millisecond (ms). If the corresponding one of token service provider networks 240a, acquirer's bank 240b, or issuer's bank 240c fails to provide the response with the characters within 50 ms, then transaction processor 120 may end up applying default characters to ensure that transaction processing using the cryptogram and digital token does not timeout and fail. A cryptogram sync component 224 may perform this default character addition based on cryptogram scheme determination 222.

Thereafter, at interaction 4, cryptogram scheme determination 222 may be used by transaction processor 120 to request addition of the corresponding portion of the cryptogram to acquirer's bank 240b required by acquirer's bank 240b. Thus, acquirer's bank 240b may provide the corresponding portion of the cryptogram to transaction processor 120, which may update the cryptogram and any data table recording cryptogram generation. Further, the risk score for the transaction and/or cryptogram generation may be provided to token service provider networks 240a, acquirer's bank 240b, and/or issuer's bank 240c for use in cryptogram generation and selection of a cryptogram key length and/or assigned portions/positions in the cryptogram. After receipt by transaction processor 120 of the characters or other data for the portion assigned to acquirer's bank 240b from acquirer's bank 240b, at interaction 4a, backwards updating of token service provider networks 240a, acquirer's bank 240b, and/or issuer's bank 240c may be performed. This may be performed by cryptogram sync component 224 of cryptogram issuing process 132 of tokenization application 130. Cryptogram sync component 224 may perform backwards updating by providing the received portion of the cryptogram and/or data table for cryptogram generation to other ones of transaction processor 120, token service provider networks 240a, acquirer's bank 240b, and/or issuer's bank 240c.

At interaction 5, issuer's bank 240c is then requested to provide additional characters or other data as required by cryptogram scheme determination 222 of transaction processor 120. Issuer's bank 240c may provide the portion required by cryptogram scheme determination 222 to transaction processor 120, which may update the cryptogram and corresponding data table. Further, at interactions 5a, cryptogram sync component 224 of transaction processor 120 performs backwards updating of other ones of token service provider networks 240a, acquirer's bank 240b, and/or issuer's bank 240c to further provide the cryptogram and/or data table for use with the digital token representing the secure data. When the cryptogram is finalized, at interaction 6, the transaction may be processed electronically using the digital token and multi-party generated cryptogram, where a payment may be provided electronically to payee device 240d and/or corresponding digital account.

Finally, at an interaction 7, the transaction may be completed by transaction processor 120 and updates to accounts, digital tokens, and the like may be performed. This may include updating a transaction ledger and/or storing a transaction history. Further, at interactions 3, 4, and/or 5, cryptogram overriding rules 226 may be used in order to override assignments and/or changes of assignments of portions of a cryptogram to transaction processor 120, token service provider networks 240a, acquirer's bank 240b, and/or issuer's bank 240c. For example, cryptogram overriding rules 226 may be used to force placement and/or assignment of portions of the cryptogram to the transaction participants based on risk rules and the like instead of changes requested to cryptogram scheme determination 222 based on further risk assessments or scores by transaction processor 120, token service provider networks 240a, acquirer's bank 240b, and/or issuer's bank 240c.

Figures 3A, 3B:
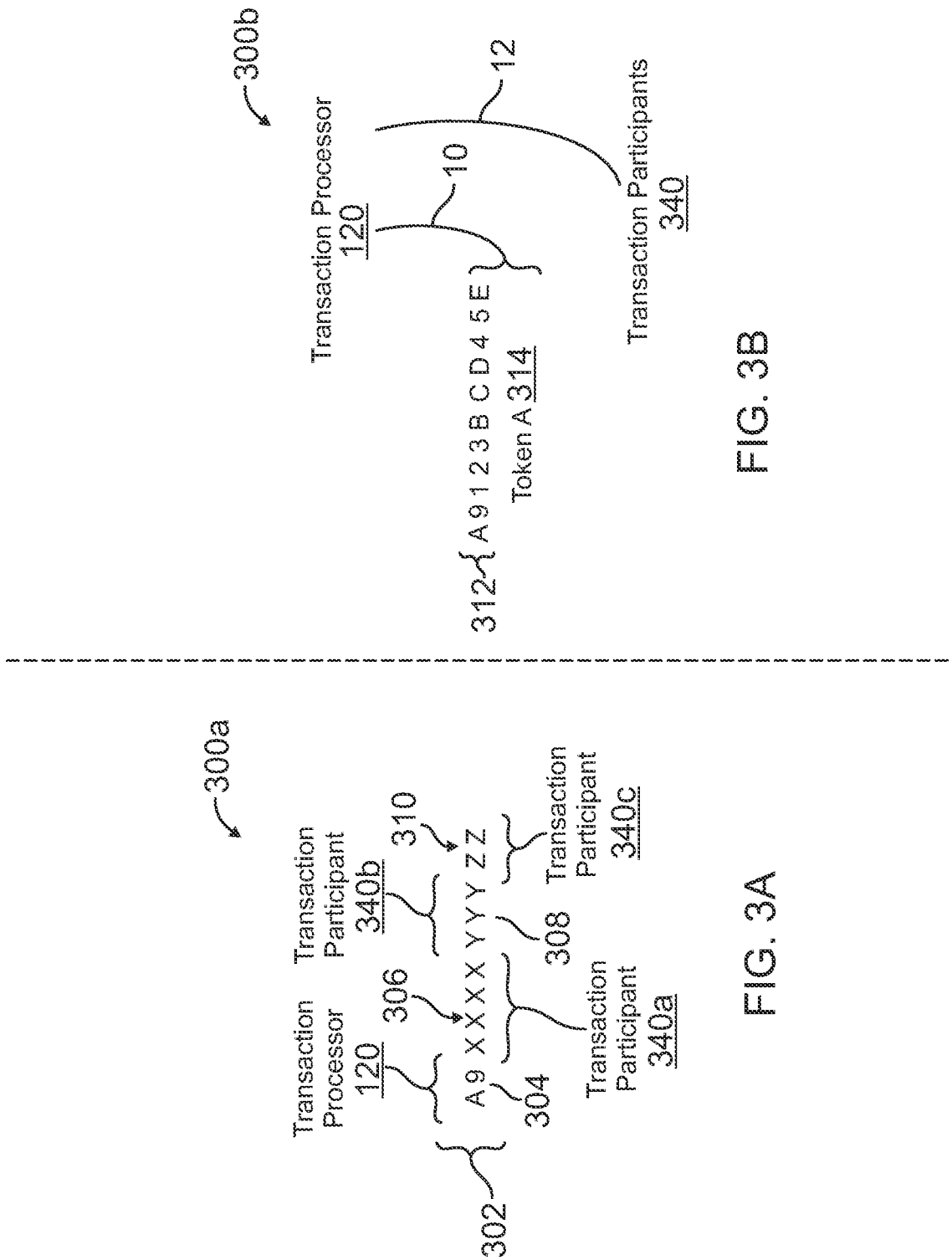
FIG. 3A is an exemplary diagram of a cryptogram during cryptogram generation between multiple parties, according to an embodiment.
FIG. 3B is an exemplary diagram of a cryptogram after multi-party generation, according to an embodiment.

FIG. 3A is an exemplary diagram 300a of a cryptogram during cryptogram generation between multiple parties, according to an embodiment. Diagram 300a includes transaction processor 120 discussed in reference to system 100 of FIG. 1 for cryptogram generation. In this regard, diagram 300a further includes transaction participants 340a-c corresponding to transaction participants 120 discussed in reference to system 100.

In diagram 300a, a cryptogram data structure 302 is shown that requires addition of characters required from different transaction participants, such as transaction processor 120 and/or transaction participants 340a-c. Cryptogram data structure 302 is shown prior to completion of the corresponding cryptogram, which may be used with a digital token in electronic transaction processing. In this regard, cryptogram data structure 302 may include different portions having slots, values, or the like that require addition of one or more alphanumeric characters, symbols or the like. Cryptogram data structure 302 therefore has a cryptogram key length of a certain number of required slots or values, shown as an 11-key length on diagram 300a. In this regard, the cryptogram key length may be determined based on a risk score associated with generation of the cryptogram for cryptogram data structure 302. This may be done through a key determination scheme generated based on the risk score, where the key determination scheme may further include portions of cryptogram data structure 302 assigned to each of transaction processor 120 and/or transaction participants 340a-c, such as one or more slots or values to provide to cryptogram data structure 302. In some embodiments, the placements may also correspond to which positions are assigned to transaction processor 120 and/or transaction participants 340a-c in addition to the number of the slots or values for each portion assigned to transaction processor 120 and/or transaction participants 340a-c.

As shown in diagram 300a, transaction processor 120 is assigned two alphanumeric characters or the like to provide to cryptogram data structure 302, shown as a portion 304. Portion 304 is shown having two slots or values, and transaction processor has provided, randomized, or otherwise generated "A9" as the characters to insert or provide to portion 304 of cryptogram data structure 302. However, transaction participants 340a-c have not yet provided their corresponding portions. For example, the key determination scheme for the key determination scheme may assign a portion 306, a portion 308, and a portion 310 to transaction participants 340a-c. In this regard, transaction participant 340a is assigned portion 306 that is currently missing (shown as "XXXX" for alphanumeric character insertion), transaction participant 340b is assigned portion 308 (shown as "YYY" for alphanumeric character insertion), and transaction participant 340c is assigned portion 310 (shown as "ZZ") for alphanumeric character insertion) based on the key determination scheme from the risk score. Further, a data table may be used with cryptogram data structure 302 for recording changes and generation of the corresponding cryptogram.

FIG. 3B is an exemplary diagram 300b of a cryptogram after multi-party generation, according to an embodiment. Diagram 300b includes transaction processor 120 discussed in reference to system 100 of FIG. 1 for cryptogram generation. In this regard, diagram 300b further includes transaction participants 340 corresponding to transaction participants 120 discussed in reference to system 100.

In diagram 300b, a completed cryptogram 312 is shown having the portions provided by transaction participants 340 (e.g., transaction participants 340a-c from diagram 300a for FIG. 3A). Completed cryptogram 312 may be completed once every portion is provided by transaction participant 340; however, where one or more participants cannot be contacted, is offline, or does not provide the corresponding portion prior to a timeout or time limit/period, transaction processor 120 may provide the corresponding portion(s), may provide null values, or may revise the key determination scheme to complete the cryptogram, or may refuse transaction processing. This may be based on one or more risk rules that may enforce certain assignments of portions of the cryptogram to certain ones of transaction participants 340.

Thereafter, completed cryptogram 312 is associated with a token A 314, which may then be used in electronic transaction processing. Thus, at interaction 10, completed cryptogram 312 and token A 314 may be finalized and ready for processing by transaction processor 120. Transaction processor 120 may then update transaction participants 340 at interaction 12, which may include processing token A 314 with transaction participants 340 during electronic transaction processing using completed cryptogram 312. Completed cryptogram 312 may be used for validation of token A 314 during electronic transaction processing and may serve as a limited or one-time use password for token A 314.

Figure 4A:
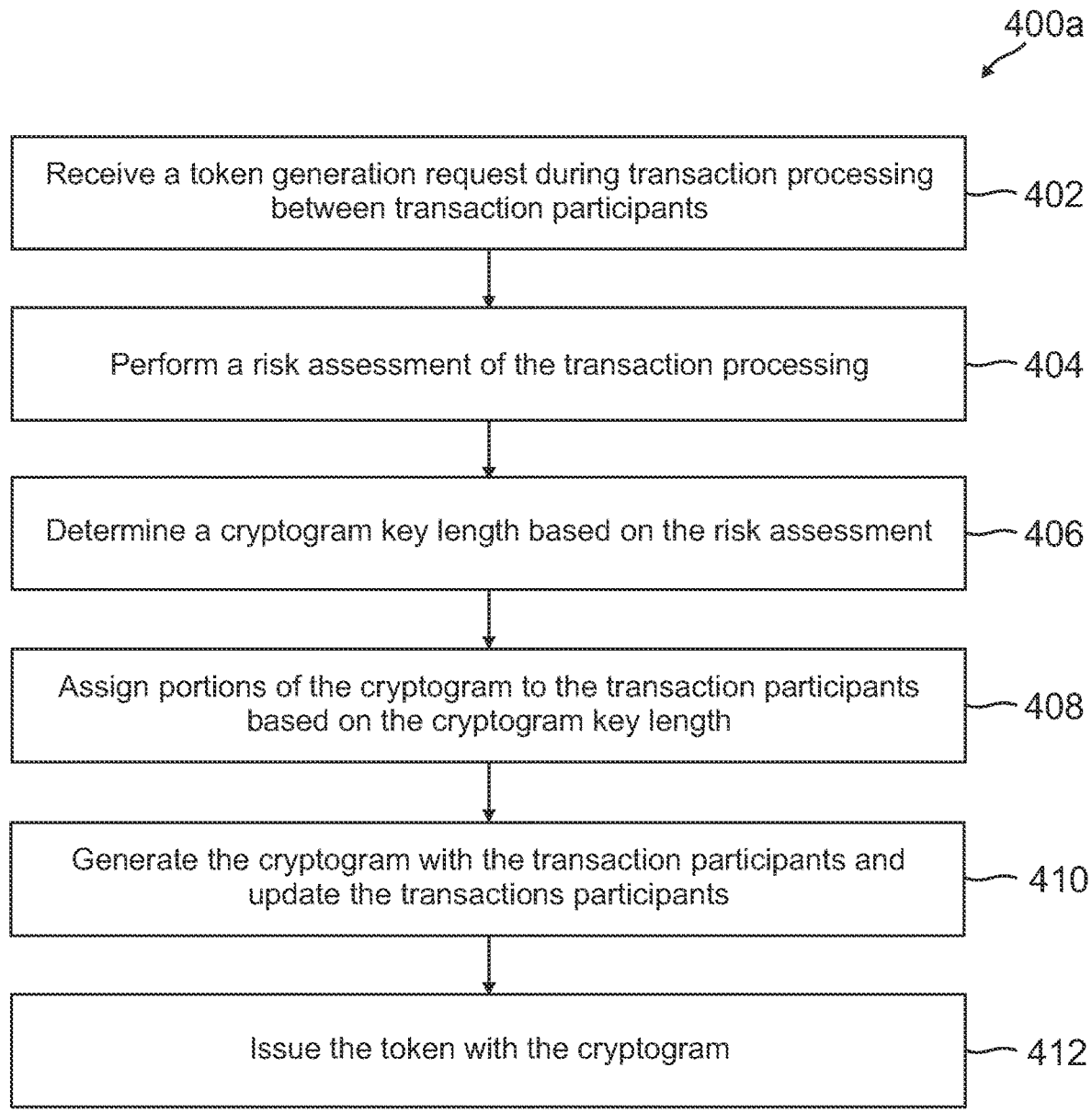
FIG. 4A is a flowchart of an exemplary process for shared cryptogram generation during multi-party digital token processing, according to an embodiment.

FIG. 4A is a flowchart 400a of an exemplary process for predictive data aggregations for real-time detection of anomalous data, according to an embodiment. Note that one or more steps, processes, and methods described herein of flowchart 400a may be omitted, performed in a different sequence, or combined as desired or appropriate.

At step 402 of flowchart 400a, a token generation request during transaction processing between transaction participants is received. The token generation request may correspond to a request to tokenize some data by representing the data with randomized or otherwise useless data that requires detokenization through a tokenization process in order to process the underlying secured data. In this regard, the token generation request may include or point to the data for securing through a digital token, such as payment card data or other financial data that risks fraud if discovered. Further, the token generation request may be associated with another processing request, such as electronic transaction processing with the transaction participants.

At step 404, a risk assessment of the transaction processing is performed, such as using an intelligent risk analysis system that may implement one or more risk ML or other AI operations to analyze risk for the transaction processing. The risk assessment may generate a risk score for the transaction processing, which may be based on data for the transaction processing, transaction participants, secure communications, and/or financial data for tokenization. The risk assessment and corresponding score is then used, at step 406, to determine a cryptogram key length. The cryptogram key length may correspond to a number of characters, digits, spots, or the like for a cryptogram that is used to validate a corresponding digital token representing the sensitive financial data. Thus, the cryptogram key length corresponds to a number of alphanumeric characters and the like that the transaction participants may be required to add to the cryptogram to generate the cryptogram.

At step 408, portions of the cryptogram are assigned to the transaction participants based on the cryptogram key length, such as through a cryptogram/key determination scheme. The assignment of the portions may correspond to a number and/or placement of the individual spots in the cryptogram to the transaction participants, which may be based on the risk score from the risk assessment, as well as risk rules that may override particular decision-making for a key determination scheme. At step 410, the cryptogram is generated with the transaction participants and the transaction participants are updated, such as through a cryptogram sync component that backwards updates the transaction participants. The cryptogram may be generated in pieces or at once based on received data for the cryptogram from the transaction participant that corresponds to their assigned portions of the cryptogram (e.g., based on the key determination scheme). Further, a data table may be used to record and timestamp changes and updates to the cryptogram, which may further be provided with the risk score to the transaction participants.

At step 412, the token, such as a digital token representing the secured data, is issued with the cryptogram. The token may therefore be validated using the multi-party generated cryptogram, which may be used to determine the corresponding data for processing. The token may then be processed by the transaction participants during electronic transaction processing or other interaction between the computing systems that utilize tokenized data. In some embodiments, prior to issuing the token with the cryptogram, one or more transaction participants may perform a risk assessment and determine another risk score or update the risk score. In such embodiments, this risk score may be used to change the cryptogram key length and/or assignment of portions of the cryptogram to one or more of the transaction participants. In such embodiments, the cryptogram key determination scheme may be updated and changes so that the corresponding cryptogram may be changed.

Figure 4B:
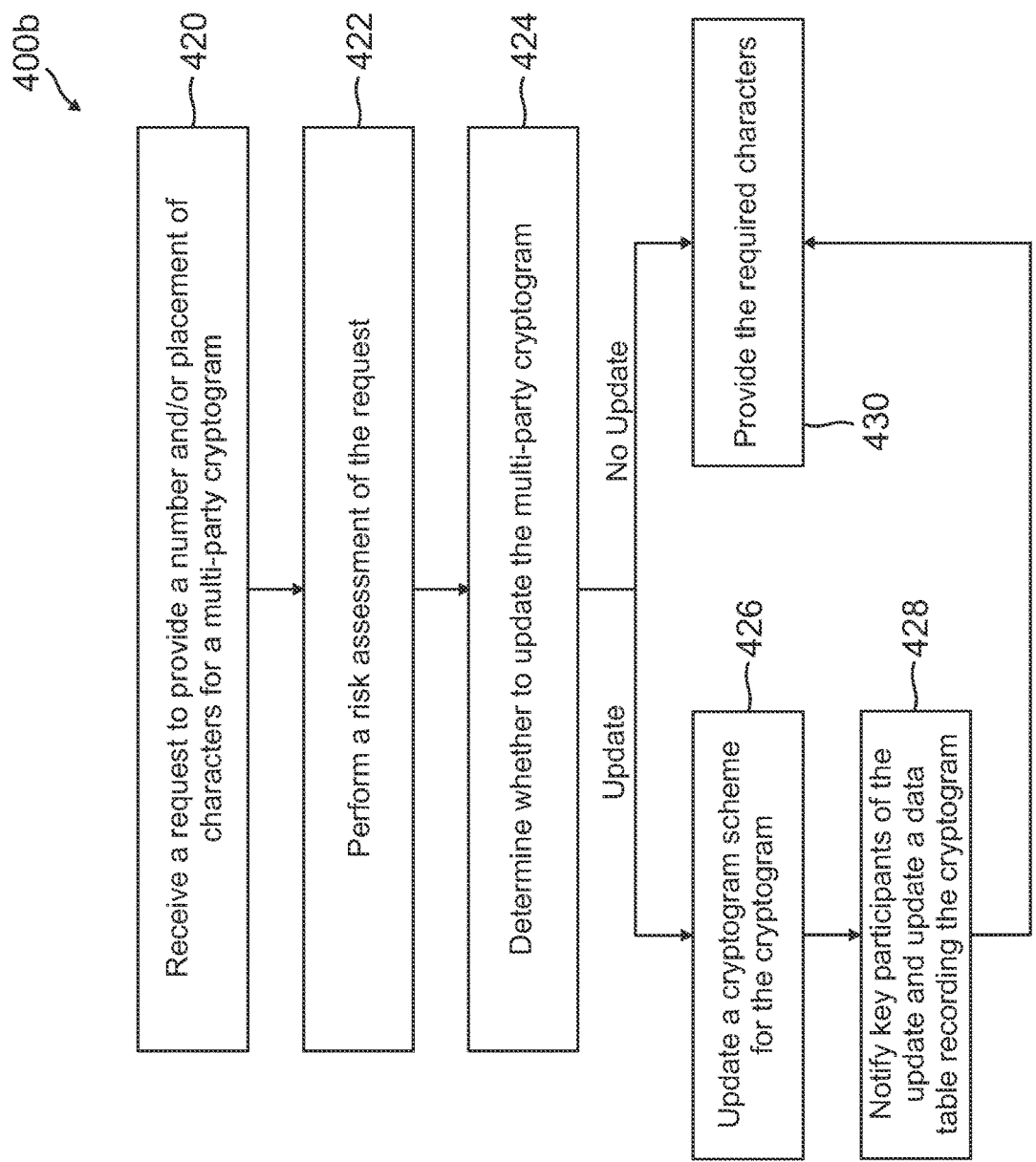
FIG. 4B is a flowchart of an exemplary process for a key participant to provide characters during multi-party cryptogram generation, according to an embodiment.

FIG. 4B is a flowchart 400b of an exemplary process for a key participant to provide characters during multi-party cryptogram generation, according to an embodiment. Note that one or more steps, processes, and methods described herein of flowchart 400b may be omitted, performed in a different sequence, or combined as desired or appropriate.

At step 420 of flowchart 400b, a request is received to provide a number and/or placement of characters for a multi-party cryptogram, based on a cryptogram scheme determined by a transaction processor. This may be received by a key participant from the transaction processor using a digital token requiring the cryptogram for electronic transaction processing. For example, a transaction processor may assign portions of a cryptogram to key participants for cryptogram generation, such as at step 408 of flowchart 400a. Thus, at step 420 of flowchart 400b, a request to provide these portions is received by one or more key participants with the assigned portions for those key participants to contribute to the cryptogram. Each key participant may then execute operations to provide characters, data values, or the like for cryptogram generation of the multi-party cryptogram based on the received request.

At step 422, a risk assessment of the request is performed, such as by a key participant after receiving the request to provide characters for the multi-party cryptogram. The risk assessment may be performed using transaction data or other data for an underlying transaction being processed using the digital token, as well as the other key participants, the transaction processor, and the communications between each entity. Further, a previously determined risk assessment by the transaction processor to initially determine a cryptogram key length and key generation scheme may be provided with the request to provide the characters for the multi-party cryptogram. This may allow for reassessment of risk in the transaction and cryptogram by a key participant. The risk assessment may be performed using an AI risk model and/or engine of the key participant, which may include different risk models and rules that cause determination of different risk scores between key participants. Key participants may also each include and use risk rules that define a minimum or maximum number of spots for that key participant to provide to the cryptogram, placements of those spots in the cryptogram, and/or whether the provided characters are alphanumeric, symbols, or the like.

Thereafter, it is determined whether to update the multi-party cryptogram, at step 424, by the key participant. This may occur when a risk score from the risk assessment meets or exceeds a threshold or maximum allowable risk score. For example, the key participant may determine that the risk score for the transaction and/or cryptogram exceeds that allowable to the key participant so that the cryptogram should be of a longer length or have more complex characters and character placements. In such embodiments, flowchart 400b proceeds to step 426, where a cryptogram scheme for the cryptogram is updated. This may be done by adding more characters to the cryptogram, changing placements of the spots assigned to key participants in the cryptogram, adding or removing spots from certain key participants, requesting a step up in authorization from a transaction participant (e.g., user, merchant, etc.) or key participant, and/or requiring more complex characters, such as an extended group of symbols in addition to alphanumeric characters.

At step 428, the key participants are notified of the update to the cryptogram scheme and a data table recording the cryptogram is updated with the updated cryptogram scheme. The key participant may provide the updated cryptogram scheme directly to each key participant and the transaction processor, which may notify each key participant of the changes. This may be done through secure communications with each participant. In other embodiments, the updated cryptogram scheme may be provided to the transaction processor, which may proceed to change the cryptogram scheme and proliferate those changes. This may include backwards updating each key participant and requesting required changes to the assigned portions of cryptogram to the key participants based on the updated cryptogram scheme. Additionally, a data table stored by the transaction processor and/or provided to each key participant may be updated with the updated cryptogram scheme so that timestamps of changes and updates to assigned portions of the cryptogram may be recorded.

Thereafter, when other key participants are updated with data table, the key participant providing the updated cryptogram scheme may then determine the required characters assigned to the key participant. Once determined, flowchart 400b proceeds to step 430, where the required characters are provided, such as to the transaction processor for cryptogram generation. Conversely, if at step 424 the key participant determines not to update the multi-party cryptogram, flowchart 400b may proceed directly to step 430 where the required characters are provided to the transaction processor. In such embodiments, the transaction processor may proceed with updating the cryptogram and data table recording cryptogram generation based on the provided characters.

Furthermore, after the characters are provided in step 430, the key participant may transmit the multi-party cryptogram to the next key participant (if there is one), and which point the next key participant may provide a respective set of assigned characters to the multi-party cryptogram based on the cryptogram scheme determined by the transaction processor or based on an updated cryptogram scheme determined by a previous key participant. Furthermore, the next key participant may also perform a risk assessment and determine whether the cryptogram scheme needs to be updated (and if so, update and inform the other participants in a similar manner as described above).

Figure 5:
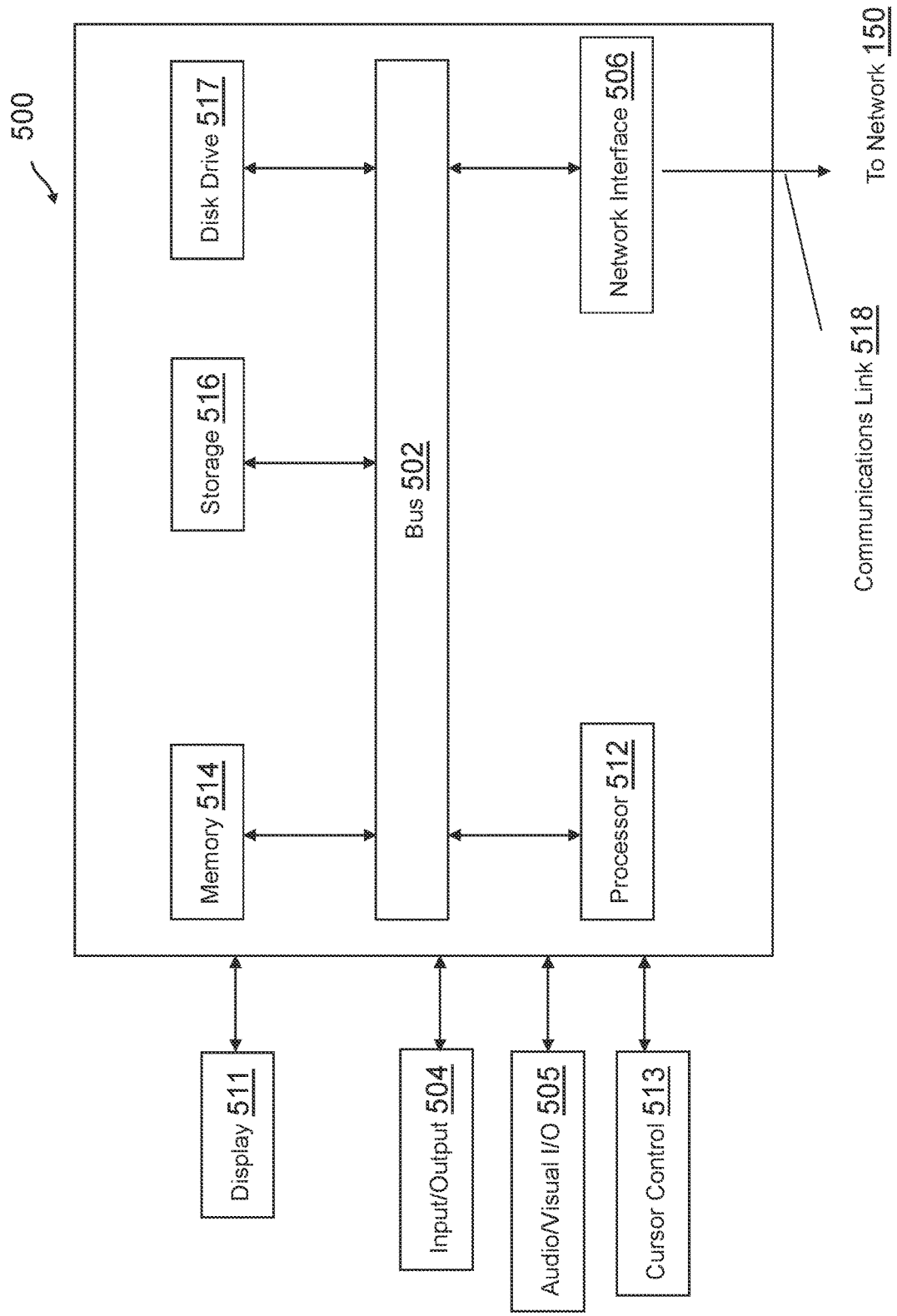
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a request for generating a cryptogram during electronic processing of a transaction using a digital token, wherein the digital token is associated with an account provided by an online transaction processor and is validated using the cryptogram;
calculating a risk score for the electronic processing of the transaction using a risk determination engine associated with the online transaction processor;
determining a risk determination key length for the cryptogram using the risk score;
determining key participants utilizing the cryptogram to validate the digital token during the electronic processing;
creating a key generation scheme based on the risk score and the risk determination key length, wherein the key generation scheme allocates portions of the cryptogram to each of the key participants;
communicating the key generation scheme to the key participants;
receiving one or more alphanumeric characters for at least a first one of the portions and a second one of the portions from corresponding ones of the key participants; and
updating the cryptogram with the one or more alphanumeric characters for each of the first one of the portions and the second one of the portions from the corresponding ones of the key participants, wherein the updating includes backwards updating each of the key participants with corresponding ones of the portions of the cryptogram generated by other ones of the key participants.

2. The system of claim 1, wherein the key generation scheme comprises an order chain of the key participants to add the portions to the cryptogram, and wherein the portions added by the key participants to the cryptogram comprise a number and a type of alphanumeric characters added by the key participants based on the key generation scheme.

3. The system of claim 2, wherein the key generation scheme comprises a placement of the portions within the cryptogram when added by the key participants.

4. The system of claim 1, wherein the operations further comprise:
providing one or more initial alphanumeric characters to the cryptogram; and
communicating the one or more initial alphanumeric characters to the key participants.

5. The system of claim 4, wherein the updating the cryptogram comprises adding the first one of the portions to the cryptogram having the one or more initial alphanumeric characters to a corresponding placement for the first one of the portions in the cryptogram.

6. The system of claim 1, wherein the one or more alphanumeric characters for first one of the portions is received prior to the second one of the portions, and where prior to the updating, the operations further comprise:
updating at least the other ones of the key participants with an updated cryptogram having one or more initial alphanumeric characters from the system and the first one of the portions.

7. The system of claim 5, wherein the operations further comprise:
further updating the updated cryptogram with one or more additional alphanumeric characters from further ones of the key participants, wherein the additional alphanumeric characters complete the key generation scheme for the cryptogram, and wherein the further updating includes further backwards updating all of the key participants with ones of the portions of the cryptogram generated by other ones of the key participants that were not previously provided by the system.

8. The system of claim 1, wherein the operations further comprise:
receiving a request to change at least one of an order of the portions or a number of alphanumeric characters in one or more of the portions based on a further risk score associated with the electronic processing; and
updating the key generation scheme based on the request to change.

9. The system of claim 1, wherein the operations further comprise:
receiving all of the portions of the cryptogram from the key participants;
finalizing the cryptogram for a use with validating the digital token; and
transmitting the cryptogram with the digital token for the use by the key participants.

10. The system of claim 1, wherein the operations further comprise:
issuing an authentication step-up requirement for the electronic processing in response to a received fraud indication.

11. The system of claim 1, wherein individual slots of the cryptogram having the risk determination key length comprise at least one of a letter, a single digit number, or a symbol.

12. A method comprising:
receiving, by an online transaction processor, a risk score associated with a transaction processed using a digital token associated with an account of a user with the online transaction processor, wherein the digital token requires a cryptogram for processing the transaction using the digital token;
determining a cryptogram key length for the cryptogram, wherein the cryptogram comprises a number of alphanumeric digits in the cryptogram;
determining participants to an electronic transaction processing chain of the transaction that use the digital token for the processing;
assigning portions of the alphanumeric digits in the cryptogram and placements of the portions to the participants for a creation of the cryptogram based on the risk score and the number of the alphanumeric digits, wherein the online transaction processor provides a first one of the portions having one or more of the alphanumeric digits;
communicating, to the participants, the cryptogram key length and corresponding ones of the portions for the cryptogram assigned to the participants;
inserting, by the online transaction processor, the first one of the portions into the cryptogram;

requesting additional ones of the portions from the participants;

receiving the alphanumeric digits for at least a first one of the portions and a second one of the portions from corresponding ones of the participants; and updating the cryptogram with the alphanumeric digits for each of the first one of the portions and the second one of the portions from the corresponding ones of the participants, wherein the updating includes backwards updating each of the participants with the corresponding ones of the portions of the cryptogram generated by other ones of the participants.

13. The method of claim 12, further comprising:

receiving all of the portions of the cryptogram from all of the participants; and updating each of the participants with previously unreceived ones of the portions of the cryptogram.

14. The method of claim 13, further comprising:

determining that the cryptogram is complete based on the receiving all of the portions of the cryptogram; and finalizing the cryptogram and the digital token with the participants for processing the transaction.

15. The method of claim 13, wherein the updating comprises generating a database table having entries based on the receiving the portions of the cryptogram from each the participants and timestamps based on receiving the at least one of the additional ones of the portions of the cryptogram.

16. The method of claim 15, further comprising:

transmitting the database table to each of the participants based on the updating.

17. The method of claim 12, wherein the risk score is based on at least one of transaction data for the transaction, a computing security breach associated with the digital token or the online transaction processor, or a computing security breach associated with one or more of the participants.

18. The method of claim 12, wherein prior to the receiving the risk score, the method further comprises:

determining the risk score using a machine learning model of a risk assessment engine associated with the online transaction processor.

19. A non-transitory machine-readable medium having stored thereon machine-readable instructions executable to cause a machine to perform operations comprising:

receiving a request for generating a digital token associated with an account, wherein the digital token is validated using a cryptogram;

generating the digital token based on the account and in response to the request;

determining a risk score associated with the request;

determining a number of slots for the cryptogram based on the risk score, wherein each of the slots comprises an alphanumeric character;

generating a cryptogram generation scheme to assign one or more of the slots to a plurality of participants associated with processing the digital token;

providing one or more initial alphanumeric characters to one or more of the slots of the cryptogram;

communicating the cryptogram generation scheme to the plurality of participants;

receiving one or more additional alphanumeric characters for at least a first one of the slots and a second one of the slots from corresponding ones of the plurality of participants; and updating the cryptogram with the one or more additional alphanumeric characters for each of the first one of the slots and the second one of the slots from the corresponding ones of the plurality of participants, wherein the updating includes backwards updating each of the plurality of participants with corresponding ones of the slots of the cryptogram generated by other ones of the plurality of participants.

20. The non-transitory machine-readable medium of claim 19, wherein, prior to the receiving the one or more additional alphanumeric characters, the operations further comprise:

requesting, based on the cryptogram generation scheme, the cryptogram from the plurality of participants after the one or more initial alphanumeric characters are provided to the one or more of the slots of the cryptogram, and wherein the updating comprises:

adding the one or more additional alphanumeric characters to the other ones of the slots of the cryptogram; and updating each of the plurality of participants with the one or more additional alphanumeric characters as the additional alphanumeric characters are added to the cryptogram.

* * * * *